J. B. PAXTON & E. I. O'NEILL.
CIRCULAR KNITTING MACHINE.
APPLICATION FILED AUG. 27, 1904.
1,068,527.
Patented July 29, 1913.
12 SHEETS—SHEET 1.
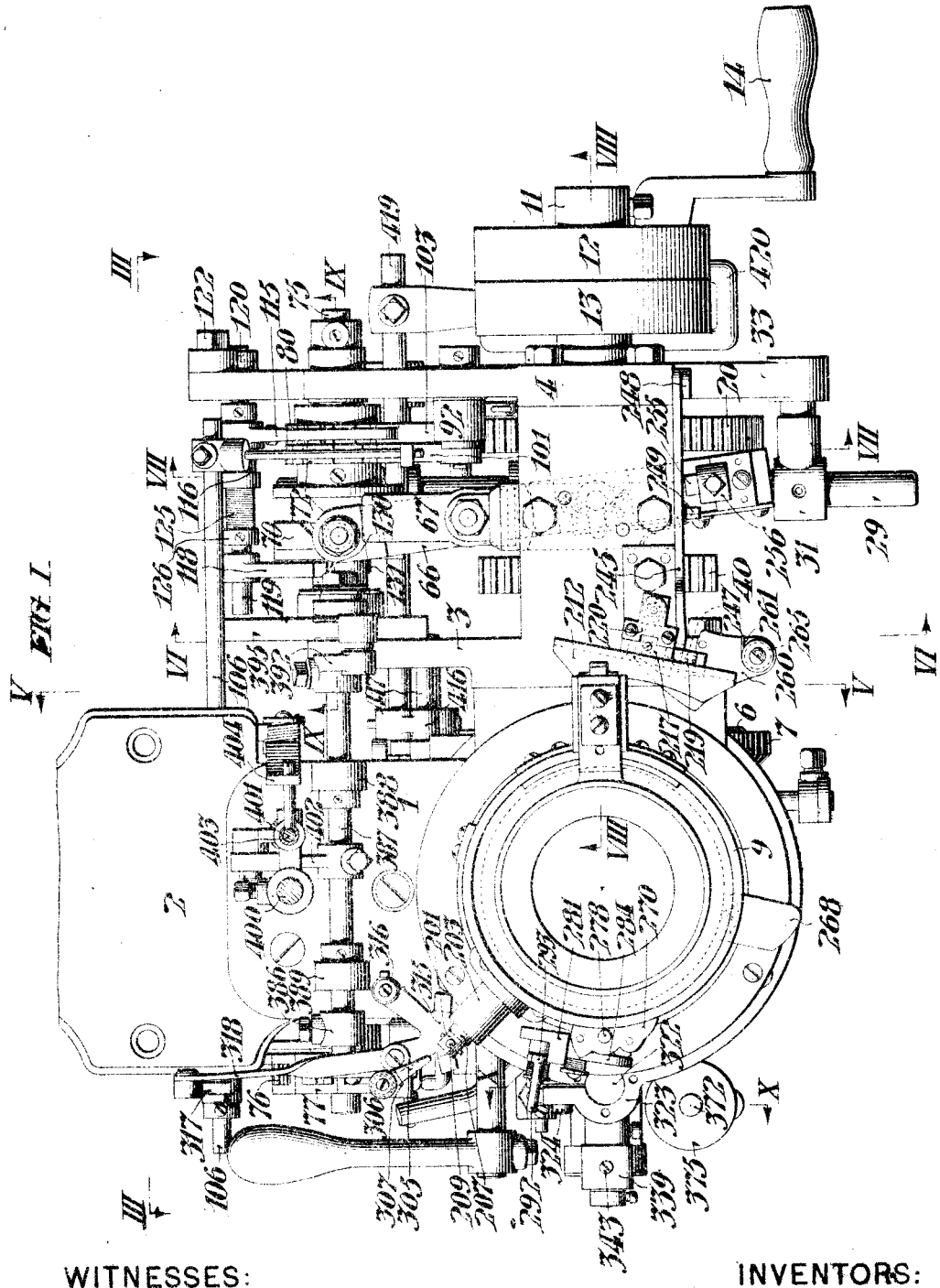
WITNESSES:
Clifton C. Hallowell
John C. Bergner
INVENTORS:
JOHN B. PAXTON
AND
ELLIS I. O'NEILL,
by their Attorneys

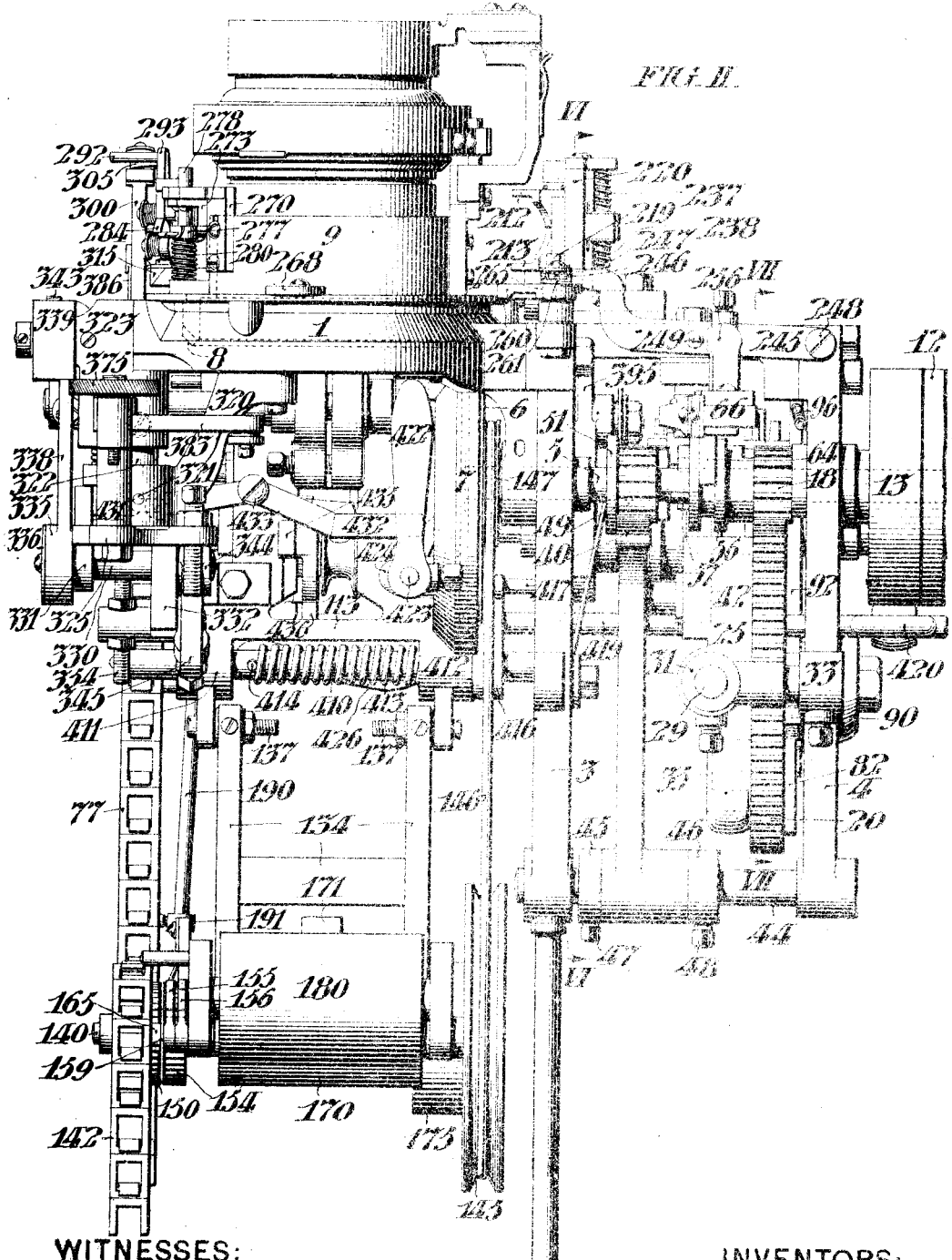

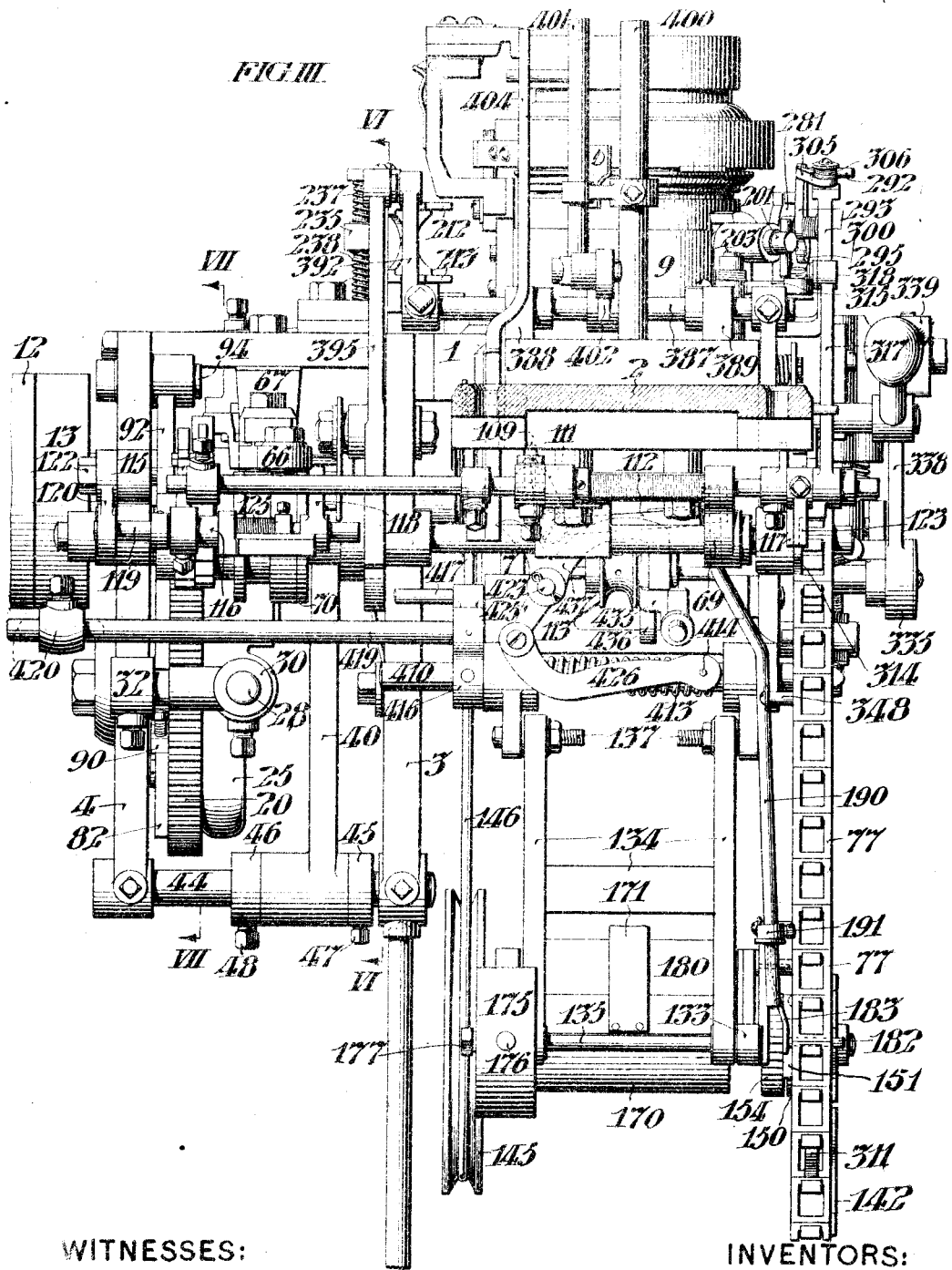

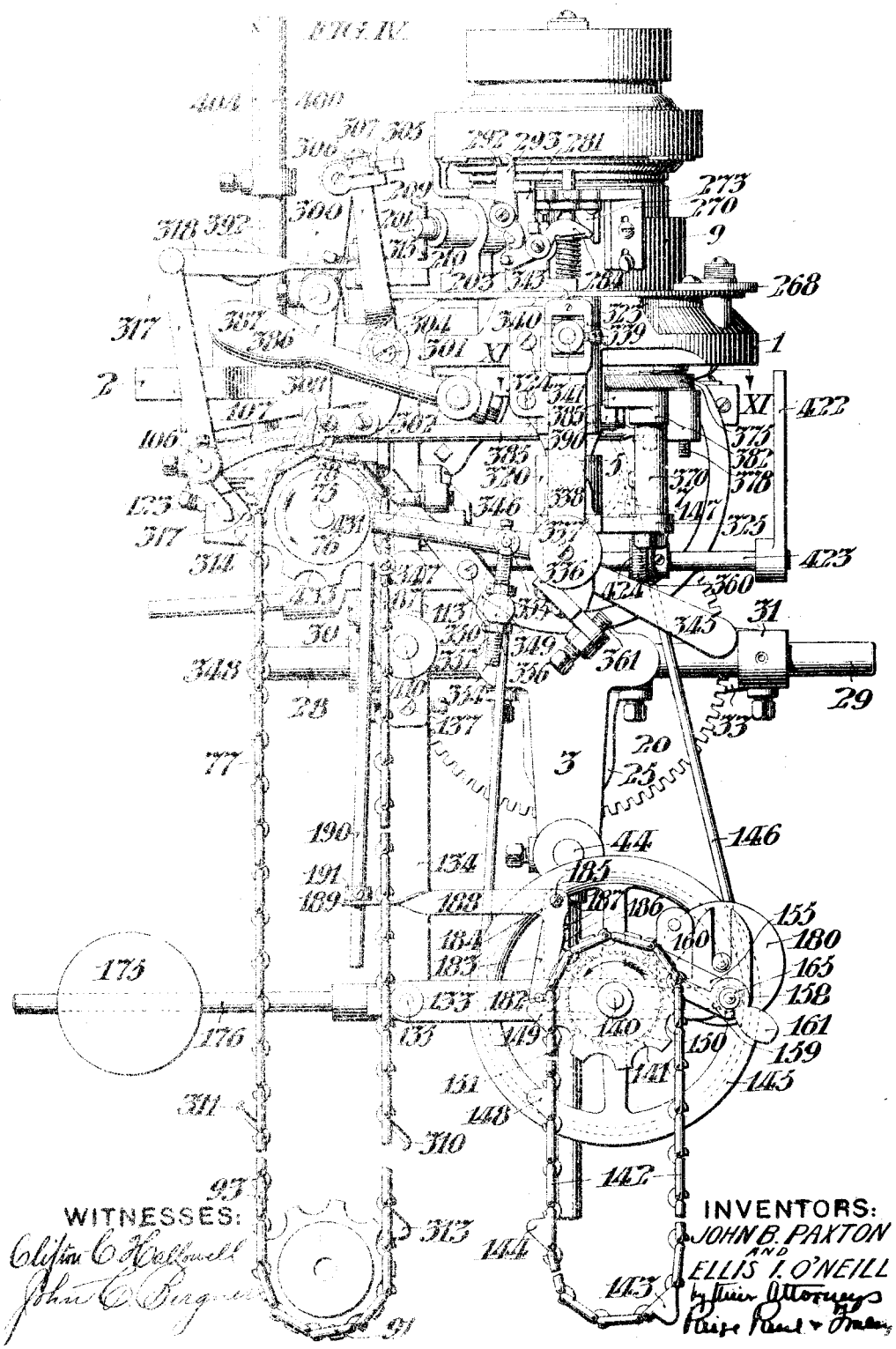

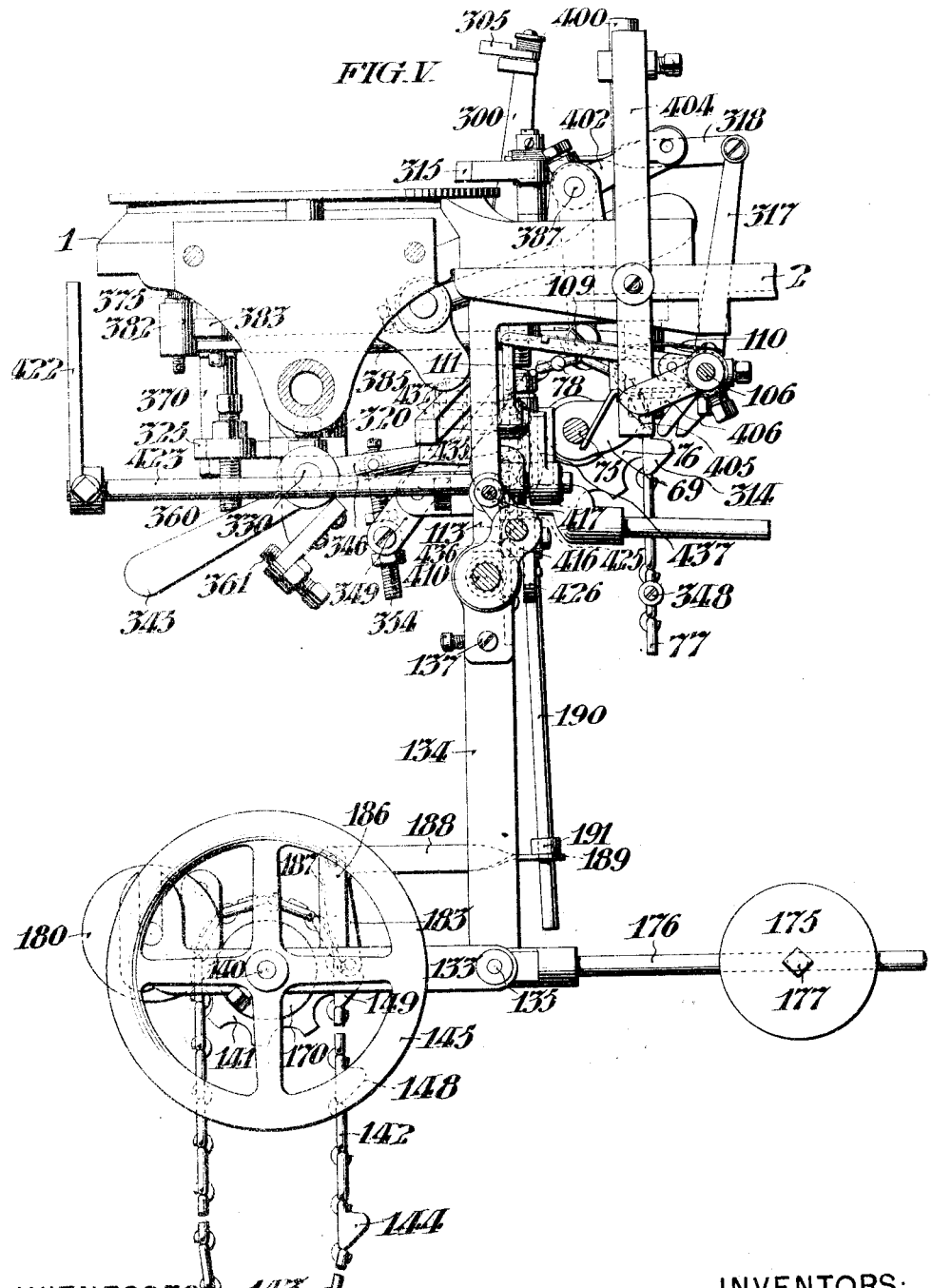
J. B. PAXTON & E. I. O'NEILL.
CIRCULAR KNITTING MACHINE.
APPLICATION FILED AUG. 27, 1904.
1,068,527.
Patented July 29, 1913.
12 SHEETS—SHEET 5.
FIG. V
WITNESSES
Clifton C. Hallowell
John E. Bergner
INVENTORS:
JOHN B. PAXTON
AND
ELLIS I. O'NEILL
by their Attorneys
Paige Paul + Foulen J. B. PAXTON & E. I. O'NEILL.
CIRCULAR KNITTING MACHINE.
APPLICATION FILED AUG. 27, 1904.
1,068,527.
Patented July 29, 1913.
12 SHEETS—SHEET 6.
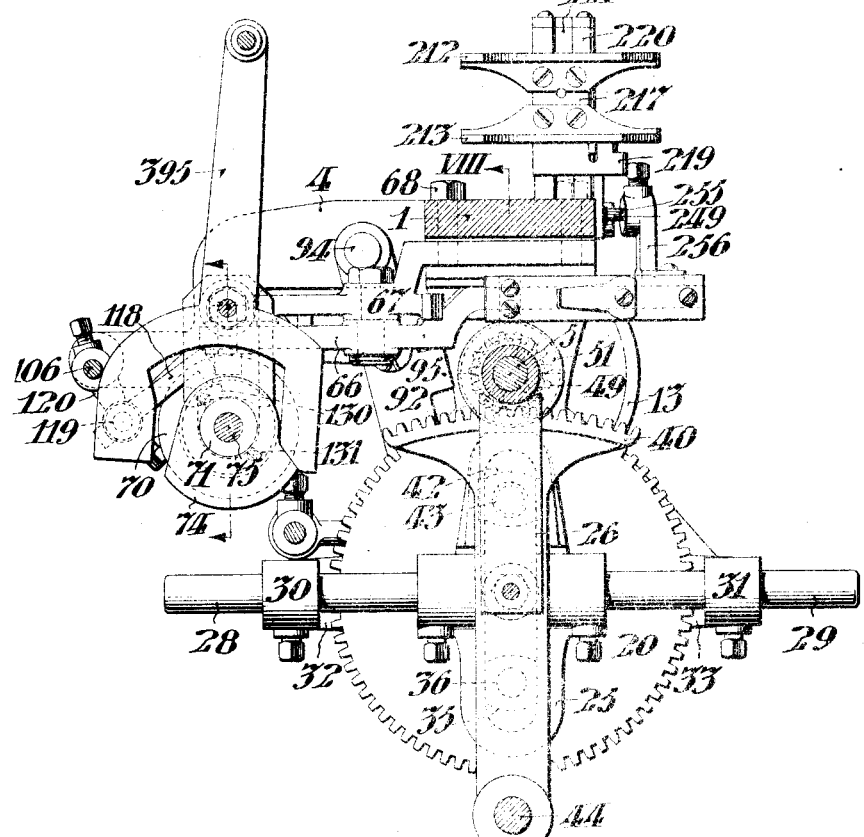
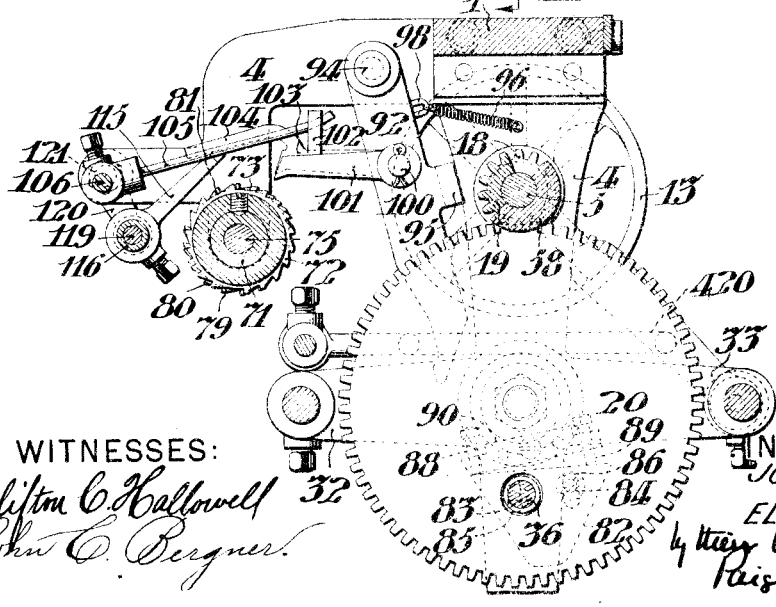
WITNESSES:
Clifton C. Hallowell
John C. Bergner
INVENTORS:
JOHN B. PAXTON
AND
ELLIS I. O'NEILL,
by their Attorneys
Paige Paul & Foulks J. B. PAXTON & E. I. O'NEILL.
CIRCULAR KNITTING MACHINE.
APPLICATION FILED AUG. 27, 1904.
1,068,527.
Patented July 29, 1913.
12 SHEETS—SHEET 7.
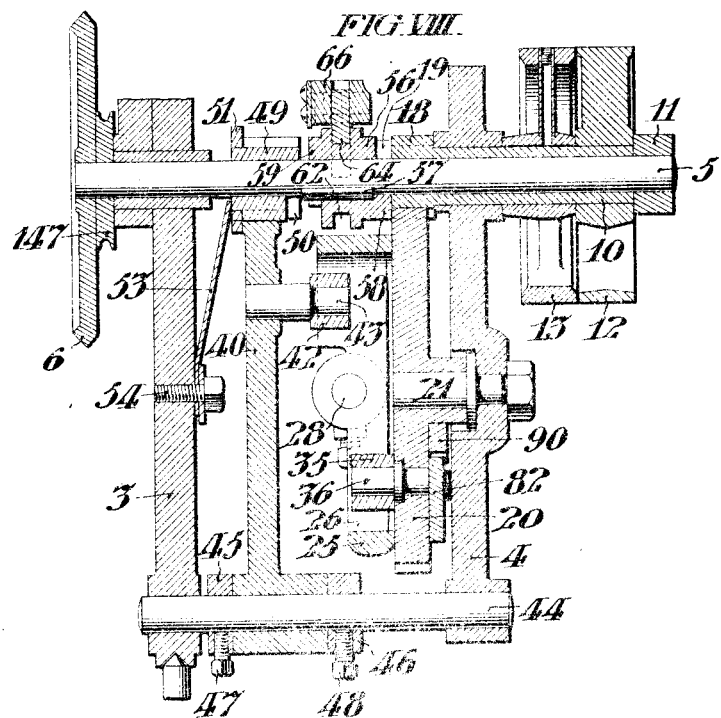
FIG. VIII.
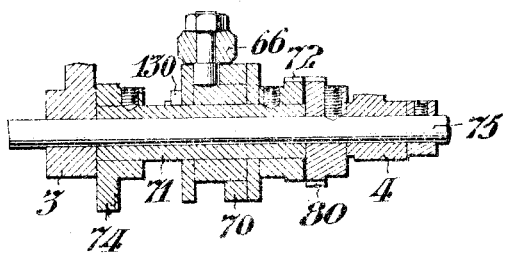
FIG. IX.
WITNESSES:
Clifton C. Hallowell
John O. Bergner
INVENTORS:
JOHN B. PAXTON
AND
ELLIS I. O'NEILL,
by their Attorneys
Paige Paul & Henry J. B. PAXTON & E. I. O'NEILL.
CIRCULAR KNITTING MACHINE.
APPLICATION FILED AUG. 27, 1904.
1,068,527.
Patented July 29, 1913.
12 SHEETS—SHEET 8.
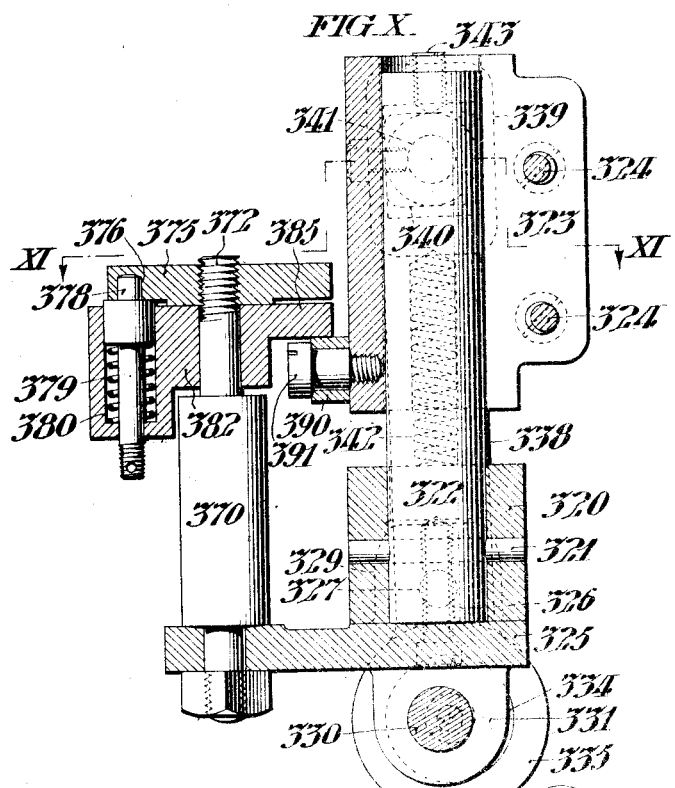
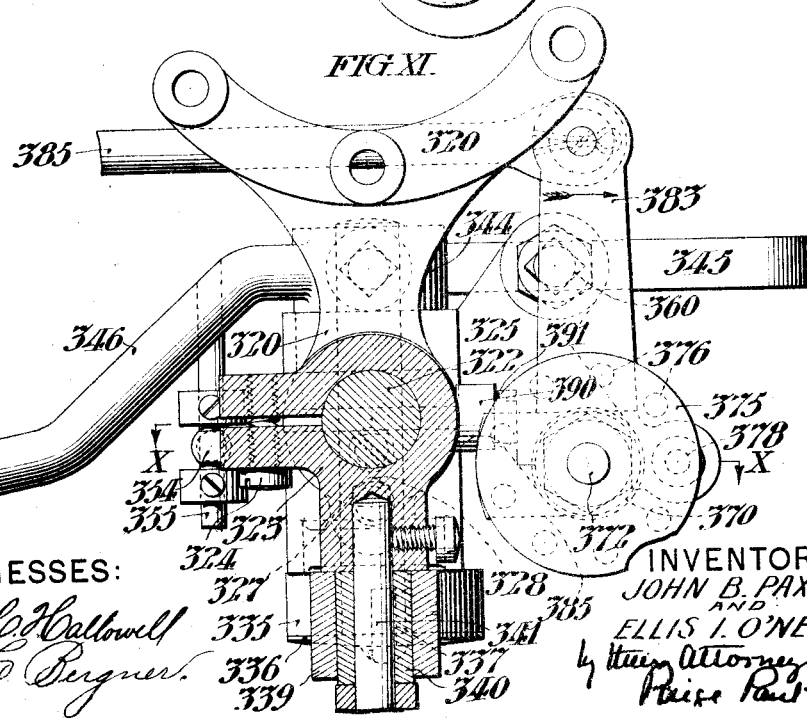
WITNESSES:
INVENTORS:
JOHN B. PAXTON
AND
ELLIS I. O'NEILL,

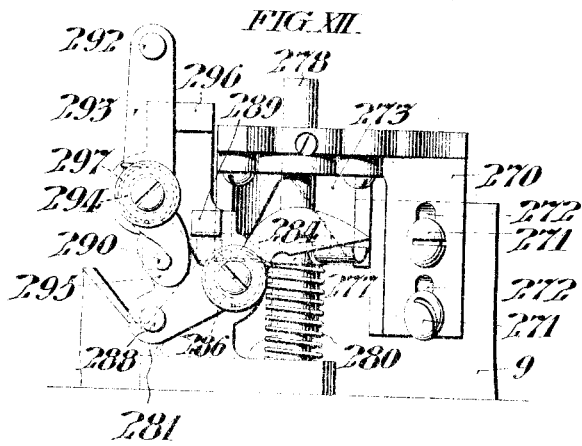
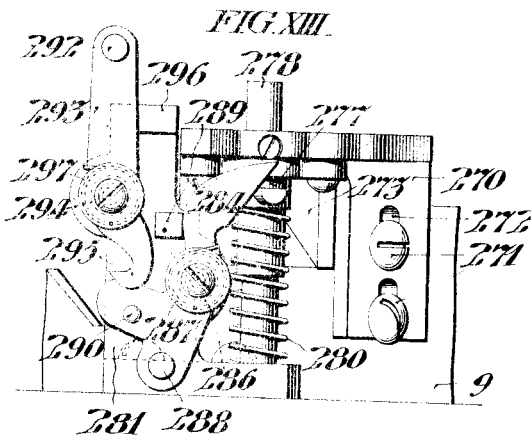
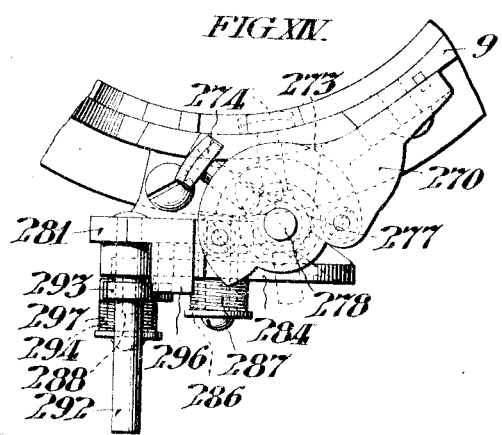

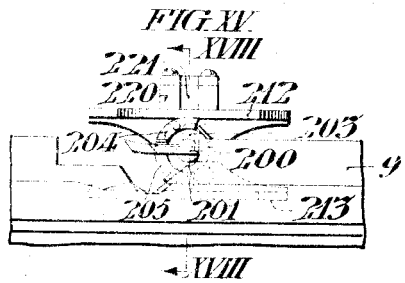
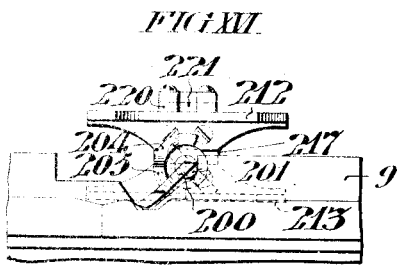
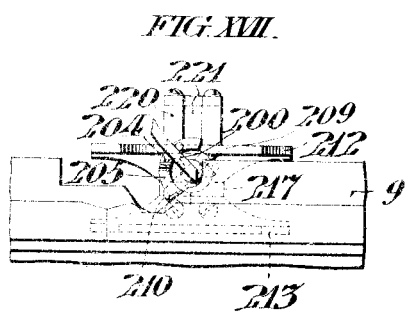
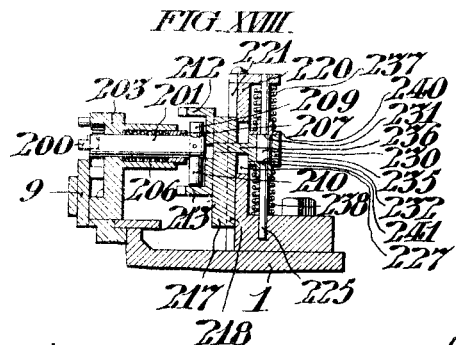

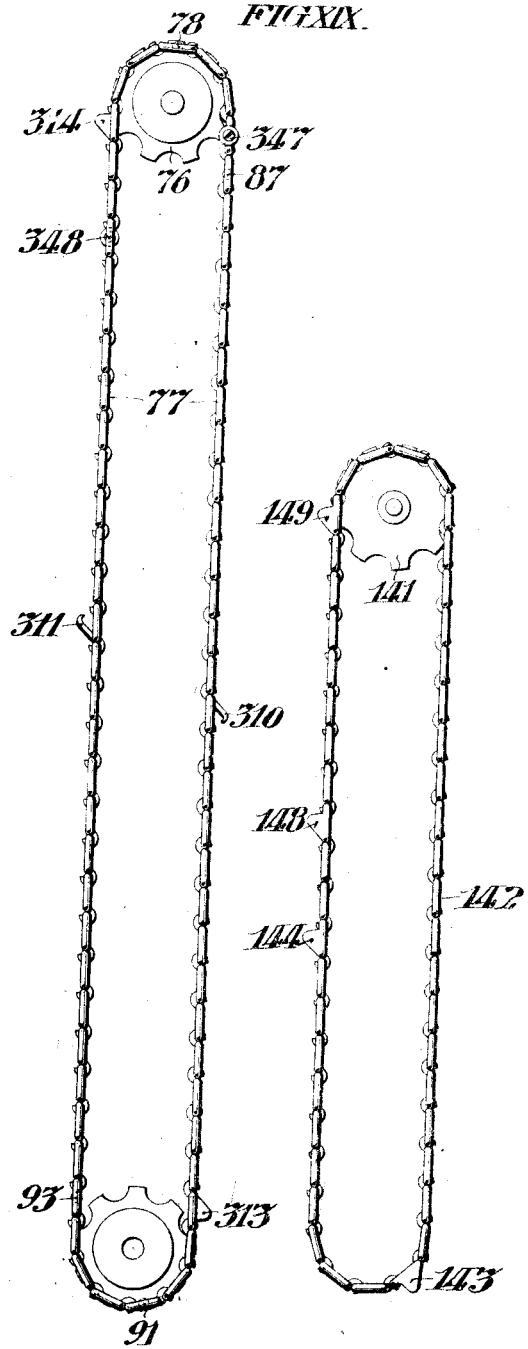

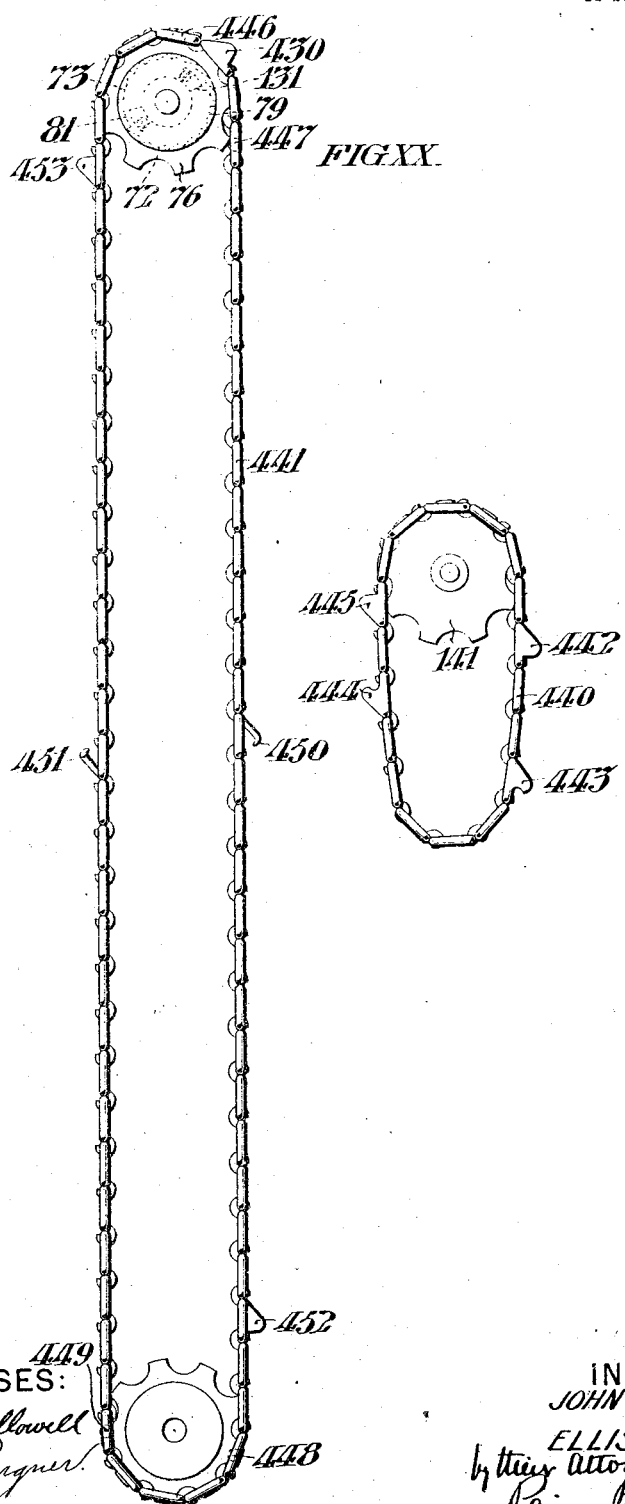

UNITED STATES PATENT OFFICE.

JOHN B. PAXTON AND ELLIS I. O'NEILL, OF PHILADELPHIA, PENNSYLVANIA; SAID O'NEILL ASSIGNOR TO SAID PAXTON.

CIRCULAR-KNITTING MACHINE.

1,068,527.    Specification of Letters Patent.    Patented July 29, 1913.

Application filed August 27, 1904. Serial No. 222,412.

*To all whom it may concern:*

Be it known that we, JOHN B. PAXTON and ELLIS I. O'NEILL, of Philadelphia, in the State of Pennsylvania, have jointly invented certain new and useful Improvements in Circular-Knitting Machines, whereof the following is a specification, reference being had to the accompanying drawings.

Heretofore in the operation of automatic circular hosiery knitting machinery it has been the practice to control the alternation of the motion of the machine from rotation to reciprocation, (and vice versa), and also the mechanism for fashioning the heel and toe pockets, by means of course measurement, that is, by the number of times the machine rotates as distinguished from actual length measurement of the resulting fabric. Great difficulty has been experienced in securing uniformity in the length of stockings (especially long hose), as produced on these machines, owing to the fact that in the employment of course measurement, very slight variations of tension, stitch length, or yarn are multiplied as the length of fabric progresses, thus resulting in stockings of unequal length. This difficulty has made it necessary to employ matching tables with their attendant expense, for matching the stockings of varying length into pairs of the same length.

We have discovered that by placing the operations performed by an automatic stocking knitter under control of length measuring mechanism, whereby the performance of the successive functions of the machine is rendered dependent upon the actual length of the fabric knit, these difficulties may be overcome, and an automatic stocking knitter may be produced which will knit stockings which are accurately matched.

Accordingly our improvements relate to an automatic circular hosiery knitting machine, so organized that the stockings as they are continuously produced on such machines are simultaneously measured as to length of fabric, with connections whereby the different operations of the machine are controlled in accordance with the length of the fabric thus measured and irrespective of the number of courses of knitting contained therein.

We are aware that length measurement has heretofore been resorted to in machines for the production of tubular rib fabric, as for making rib tops, and rib cuffs, but this is very different both in the method of its accomplishment and in its results from our invention, for in these cases uniform measurement of the product is not important and the direct relation of the take-up to the pattern chain has been resorted to merely as a convenient means of controlling certain auxiliary operations which the ribber may perform, such as the production of loose courses, welt courses, and the like. It was a comparatively simple matter to effect the control of these operations by length measurement, but heretofore, so far as we are aware, no one has attempted to control the more complicated and intricate sequence of operations and heavier machinery involved in the automatic stocking knitter by length measurement. This we have accomplished and have found the results to be of economical importance to the art.

We have described and illustrated our invention as applied to an automatic stocking knitter, the needle cylinder of which is provided with needles having butts of different lengths and provided with fashioning mechanism; a cam adapted to raise and lower the temporarily idle series of long butt needles; and motion changing mechanism which causes one cylinder to rotate continuously in relation to the other during plain knitting, and to oscillate during the fashioning operation. The machine as shown and described is capable of knitting both long hose, which may be produced as string-work, or half hose.

Our invention further comprises a half-back cam which, being arranged to raise and lower the needles in accordance with its position, contemporaneously oscillates and axially reciprocates in changing from one position to the other.

The measuring device comprises a roller which engages the fabric. As shown it positively draws it through the needle cylinder in definite relation to the knitting operation. Said roller is provided with a shaft which carries a measuring chain having a special link which, at a predetermined point in its traverse, initiates the movement of the motion changing mechanism, thereby operates a pair of cams to set the half-back needle cam in operation, and, also initiates the movement of a pattern chain which is supported on a countershaft and provided with connections, whereby the movement of said pattern chain is terminated after effecting the reverse movement of the motion changing mechanism. Said machine also comprises certain adjunctive devices, under the control of said measuring mechanism, adapted to operate a thread changing mechanism of any suitable construction.

Our invention comprehends the various novel features of construction and arrangement hereinafter more definitely specified.

In the accompanying drawings, Figure I, is a plan view of a knitting machine conveniently embodying our improvements. Fig. II, is a front elevation of said machine. Fig. III, is a rear elevation of said machine, the supporting leaf being sectioned on the line III, III, in Fig. I. Fig. IV, is a left side elevation of said machine as shown in Figs. I, and II. Fig. V, is a vertical transverse sectional view, taken on the line V, V, in Fig. I. Fig. VI, is a vertical transverse sectional view, taken on the line VI, VI, in Figs. I, II, and III. Fig. VII, is a vertical sectional view, similar to Fig. VI, taken on the line VII, VII, in Figs. I, II, and III. Fig. VIII, is a vertical longitudinal sectional view, taken on the line VIII, VIII, in Figs. I, and VI, viz; the axial line of the main driving shaft. Fig. IX, is a vertical longitudinal sectional view, taken on the line IX, IX, in Fig. I, viz; the axial line of the counter or cam shaft. Fig. X, is a vertical sectional view of the tension regulating device, taken on the line X, X, in Figs. I and XI. Fig. XI, is a plan sectional view of said tension regulating device, taken on the line XI, XI, in Figs. IV and X. Fig. XII, is a fragmentary side view of the picker mechanism detained in inoperative position. Fig. XIII, is a view similar to Fig. XII, but with the picker mechanism released and in operative position. Fig. XIV, is a plan view of the parts shown in Fig. XII. Fig. XV, is a fragmentary inside elevational view of the rotary cam cylinder, showing the half-back needle raising and lowering cam, in inoperative position, and the pair of vertically adjustable cams for setting the same. Fig. XVI, is a view similar to Fig. XV, showing said half-back needle cam in position to raise the needles. Fig. XVII, is a view similar to Fig. XV, showing said half-back needle cam in position to lower the needles. Fig. XVIII, is a vertical sectional view, taken on the line XVIII, XVIII, in Fig. XV. Fig. XIX, is a side elevation of a pattern chain and measuring chain arranged to control the machine to knit long hose. Fig. XX, is a side elevation of a pattern chain and measuring chain arranged to control the machine to knit half hose.

In said figures, 1, is the bed plate having the rearwardly projecting supporting leaf 2, and depending bearing frames 3, and 4, which latter are arranged to support the motion changing mechanism. Said mechanism comprises the main shaft 5, having the bevel gear 6, protected by the guard 7, and engaging the gear 8, on the cam cylinder 9. Said shaft 5, is journaled in the sleeve 10, and prevented from lateral movement by the collar 11, best shown in Fig. VIII. Said sleeve 10, is journaled in the frame 4, and provided with tight and loose pulleys 12, and 13, the latter having the usual handle 14. The pinion 18, carried by said sleeve 10, engages the gear 20, which rotates on the stationary stud 21, in the frame 4.

The yoke 25, having the slot 26, comprises the alined slide bars 28, and 29, arranged to slide in the adjustable guides 30, and 31, which are rigidly secured in the arms 32, and 33, on said frame 4. Said yoke is arranged to be reciprocated by the engagement of its slot 26, with the slide block 35, on the crank pin 36, carried by the gear 20. Said yoke 25, is arranged to transmit oscillatory motion to the gear sector 40, by the engagement of its slot 26, with the slide block 42, carried by the crank pin 43, on said sector. Said sector 40, is fulcrumed on the stationary shaft 44, which rigidly connects the lower ends of the frames 3, and 4; said sector being mounted between the collars 45, and 46, which are secured in stationary position on said shaft, by the set screws 47, and 48. When said yoke 25, is reciprocated by its connection with the gear 20, the sector 40, transmits oscillatory motion to the pinion 49, which is loosely mounted on the shaft 5. As shown in Fig. VIII, said pinion 49, has the circumferential flange 51, which is pressed against the side of the sector 40, by the spring 53, secured to the frame 3, by the tap bolt 54.

The clutch collar 56, is mounted on the shaft 5, between the pinions 18, and 49, and engaged by the key 57, to rotate and oscillate with said shaft, but is capable of longitudinal movement thereon. Said clutch collar 56, has the sectoral lugs 58, and 59, on its opposite sides arranged to alternately engage the sectoral lugs 19, and 50, on the respective pinions 18, and 49. Said clutch collar 56, has the circumferential groove 62, engaged by the yoke 64, carried by the clutch lever 66, which latter is fulcrumed on the bracket 67, secured to the bed plate 1, by the bolts 68. Said lever 66, is automatically operated by the clutch cam 70, on the sleeve 71, which is loosely mounted on the counter or cam shaft 75; the latter being journaled at one end in the frames 3, and 4, and at the other end in the bracket 69, depending from the bed plate 1.

Referring to Figs. VI, VII, and IX; it may be here noted that in addition to said clutch cam 70, the sleeve 71, carries the ratchet 72, having blank portions 73, 79, and 81, and, the cam 74, arranged to control the tension regulating mechanism and a suitable thread changing mechanism. Said counter or cam shaft 75, is provided at one end with the sprocket wheel 76, carrying the pattern chain 77, and at the other end with the ratchet wheel 80. The gear 20, carries the cam 82, secured in adjustable relation thereon by the screws 83, and 84, extending through the slots 85, and 86, in said cam 82, and adjustable by the set screws 88, and 89, entered in the block 90, on said gear 20. In order to intermittently rotate said sleeve 71, and counter shaft 75, by their respective ratchets 72, and 80, we provide the lever 92, which is fulcrumed on the stud 94, on the frame 4, and has the lug 95, arranged to encounter said frame 4, and limit its movement; being normally held in the position shown in Fig. VII, by the spiral spring 96, connecting the eye 98, in said lever 92, with said frame 4. Said lever 92, being thus arranged to be oscillated to the left (in Fig. VII), by the cam 82, at each rotation of the gear 20; is provided with the stud 100, upon which are pivoted the pawl 101, having the eye lug 102, and the pawl 103, having the finger 104. Said pawl 101, is normally upheld from engagement with its ratchet 72, by the engagement of its eye lug 102, with the lever arm 105, on the rock shaft 106, and, said shaft 106, is rocked by the lever 107, (see Fig. IV) to the position assumed in the drawings and best shown in Fig. VII. Said lever 107, is raised by the short side links 78, 87, 91, and 93, on the pattern chain 77, and, the lever 109, on the shaft 106, (comprising two knuckle jointed members normally held straight by the spring 110), detains said shaft 106, in the position specified, as shown in Fig. V; being upheld by the vertical arm 111, of the bell crank lever which has the horizontal arm 112, and is pivoted on the bracket 113. The pawl 103, is arranged to turn the cam shaft 75, and said chain 77, in the direction of the arrows shown in Fig. IV, by engagement with its ratchet 80, on said shaft 75; but is normally upheld from engagement during the continuous rotation of the cam cylinder by the finger 104, engaging the lever 115, which is adjustably secured on the sleeve 116, carrying the lever 118. Said sleeve 116, is loosely mounted on the stationary shaft 119, which is carried by the link 120, and may be adjusted toward and away from said cam shaft 75, by tilting said link on its pivot 121, and securing it to the frame 4, by the tap bolt 122. The levers 115, and 118, are normally tilted toward said cam shaft 75, by the spring 125, which encircles the shaft 119, and is engaged at one end to said levers and at the other end to the collar 126, secured on said shaft 119; but, the lever 115, is upheld and upholds the pawl 103, by the engagement of the lever 118. with either of the cams 130, and 131, on the side of the clutch cam 70, (as shown in Fig. VI), until said clutch cam is rotated sufficiently to draw said cams from under said lever 118; whereupon, the pawl 103, is dropped into engagement with its ratchet 80, to thereby rotate the cam shaft 75, and pattern chain 77, to effect certain operations of the machine as hereinafter described.

The motion changing mechanism, above described, is controlled by the measuring mechanism, as follows: As shown in Figs. IV, and V, the measuring mechanism is carried by the horizontal frame 133, pivotally connected with the vertical frame 134, by the rod 135, and, said frame 134, is pivotally suspended from the frame hanger 113, by the screw studs 137. The horizontal shaft 140, of said measuring mechanism is journaled in said frame 133, and provided at one end with the loose sprocket wheel 141, carrying the measuring chain 142, having special links 143, 144, 148, and 149. The band wheel 145, on the opposite end of said shaft 140, is connected by the band 146, with the band wheel 147, on the main driving shaft 5, adjoining the bevel gear 6. Said sprocket 141, is provided with the ratchet 150, arranged to be progressed by the spring pawl 151, carried by the ratchet 154, mounted to rotate with the shaft 140, in the direction indicated by the arrow in Fig. IV, and, is normally prevented from rotation in the opposite direction by the keeper pawls 155, and 156; the former being slightly longer than the latter to minimize the lost motion of said ratchet 150. Said pawls 155, and 156, are pivoted on the stud 158, extending from the frame 133, and may be manually disengaged from said ratchet 154, by the releasing lever 159, shown in Figs. II and IV, which being pivoted on said stud 158, has its end 160, extending beneath said pawls 155, and 156, to contemporaneously uplift them when the finger piece 161, is depressed. Said keeper pawls 155, and 156, and releasing lever 159, are held on said stud 158, by the collar 165. The shaft 140, carries the take up or measuring roller 170, conveniently provided with the flexible connector 171, to which the knit fabric may be attached and thereby drawn down under tension which may be varied by shifting the counterweight 175, along the rod 176, projecting from the frame 133, said weight 175, being held by the set screw 177. It may be noted that the frictional engagement of the band 146, on the wheels 145, and 147, is also varied by the adjustment of said weight. Although said take up roller 170, may be used alone to take up and measure half hose, we find it desirable, when knitting longer fabric, to draw said fabric down by a flexible connector until a length has been knit sufficient to be engaged by the roller 170, and then disconnect said connector and journal the roller 180, in the frame 133, in opposition to said roller 170, so that the fabric may pass under the roller 170, and over the roller 180, and be thereby drawn down.

During the knitting of plain tubular fabric, the take up roller 170, being continuously rotated draws said fabric downward until a certain length thereof is knit, determined by the length of chain between the special links of the chain 142; thereupon, one or the other of said special links engages the pin 182, in the vertical arm 183, of the bell crank lever 184, which latter is pivoted at 185, on the standard 186, in said frame 133, and normally gravitates toward said chain 142, against the stop pin 187, in said standard 186. The arm 188, of said lever 184, has the aperture 189, for the rod 190, and supports the latter by its collar 191. The upper end of said rod 190, being pivoted to the horizontal arm 112, of the bell crank lever the latter is tilted and its vertical arm 111, drawn from under the lever 109, when the chain 142, operates said lever 184, as above described and, said lever 109, then drops, turns the rock shaft 106, and permits the pawl 101, to drop into its ratchet 72, to rotate the sleeve 71, and its cam 70. Said cam 70, then shifts the clutch lever 66, and its clutch 56, to engage the oscillatory pinion 49; and thus changes from rotary to oscillatory motion of the cam cylinder.

The mechanism for raising and lowering the half-back needles which have longer butts than the instep needles comprises the cam 200 in form of a single flat plate, mounted on the horizontal plunger 201, which is rotatably mounted with capacity of motion coincident with its axis in the bracket 203, on the cam cylinder 9, having the oppositely inclined cams 204, and 205, to respectively engage said cam 200, when it is rotated from its outer normally inoperative position, shown in Fig. XV, to the positions for raising and lowering the half-back needles respectively shown in Figs. XVI, and XVII. Said cam 200, is normally retained in inoperative position by the spring 206, in the bracket 203, pressing against the collar 207, on said plunger 201. The outer end of said plunger 201, is provided with two projections 209, and 210, respectively extending radially above and below said plunger 201, for engagement with the respective setting cams 212, and 213, when said cams are raised or lowered, as shown respectively in Figs. XVI and XVII, (a position only occupied at a time when the cam 200, is traveling to the left with respect to Figs. XV, XVI, and XVII.) When said cams 212, and 213, are raised the lower projection 210, encounters the cam 213, and partly rotates the plunger 201, and cam 200, so that the latter, riding on the cam 205, is shifted in a direction coincident with its axis into the path of the half-back needle hubs, which are longer than the others. Likewise when said setting cams 212, and 213, are lowered, the upper projection 209, encounters the cam 212, and partly rotates the plunger 201, and cam 200, so that the latter, riding on the cam 204, is axially shifted into the path of said needle hubs, in position to lower them. The rotary movement of the cam 200, is limited in its lower position, as shown in Fig. XVI, by the wall of the cam cylinder 9, and in its upper position by a pin projecting from the face of the cam 204, as best shown in Fig. XVII.

As shown in Fig. XVIII, the cams 212, and 213, are rigidly coupled by the slide block 217, and are arranged for vertical reciprocation on the guiding standard 220, which has the vertical groove 221, for the rib 218, on the slide block 217. Said standard 220, is stationary on the bed plate 1, and is provided with the stationary vertical rod 225, having the central enlargement 230, forming the shoulders 231, and 232, and embraced by the vertically movable block 235, whose pin 236, extends through the vertical slot 227, in the standard 220, into the slide block 217. Said slide blocks 217, and 235, are normally held in the central position, shown in Figs. XV, and XVIII, by opposed spiral springs 237, and 238, encircling said rod 225, and bearing at their adjacent ends against the respective washers 240, 241, which normally rest upon the shoulders 231, and 232, on said rod. When said slide block 217, is raised it lifts the washer 240, against the spring 237, and when said block 217, is lowered it lowers the washer 241, against the spring 238.

The slide block 217, carrying the setting cams 212, and 213, may be raised or lowered by the lever 245, having the slot 246, engaging the pin 247, in said block 217, and pivoted on the stud 248, in the frame 4, as indicated in Fig. II. Said lever 245, is provided with the lug 249, projecting into the path of the cam 255, adjustably secured in the standard 256, on the clutch lever 66, as shown in Figs. I and VI. The lug 249, and cam 255, are so constructed and arranged that when the clutch lever 66, is shifted to change from rotary to reciprocatory motion of the cam cylinder, the lever 245, is raised and uplifts said slide block 217, and its cams 212, and 213 and, when said lever 66, is shifted to change from reciprocatory to rotary motion, of said cylinder, said lever 245, is depressed and lowers said block 217, and its cams 212, and 213. Said slide block 217, is arranged to be detained in its raised and lowered positions by its lug 219, engaging the locking plate 260, which is pivoted on the post 265, and is normally pressed against said lug 219, by the spring 261, encircling said post 265; so that when the block 217, is raised or lowered by the lever 245, said locking plate 260, is shifted horizontally by said spring 261, respectively beneath or above said lug 219, and thereby retains said slide block 217, in its abnormal position, until said locking plate 260, is returned against the tension of its spring 261, by the cam 268, carried by the cam cylinder 9.

The mechanism for raising and lowering the series of half-back needles, which are idle during the fashioning operation, differs from previous mechanisms which have heretofore performed this general function in the following particulars: The cam 200, consists of a single plate, one side of which performs the function of a depressing cam, while the other side performs the function of a raising cam. Between these two positions there is what may be termed an intermediate inactive position, which is illustrated in Fig. XV. It is a peculiarity of our mechanism, that in this intermediate inactive position, the cam 200, is withdrawn radially so far from the axis of the cylinder, as to be entirely out of reach of the butts of any of the needles, or of any other part of the needle cylinder, thereby relieving the cam cylinder from the cluttering effect of this cam, at all times, except when it is positively active to perform its necessary functions. The cam is thrown from its intermediate inactive position, in which it is ordinarily held under tension of the spring 206, only when one or other of the projections 209, or 210, are engaged by the surfaces of the respective setting cams 212, or 213, but it will be noted that these setting cams are not called upon to perform more than a momentary function of rotating the cam 200, to one or other of its operative positions, since, as soon as the cam 200, has commenced to engage and depress the long butts of the idle series of needles, these butts, by their own resistance, hold the cam in its active position until its function is fully performed, whereupon the cam is free to return under the influence of the spring 206, to its intermediate inactive position, without the necessity of any further control, either by the setting cams, or any other part of the machine. This simplifies the mechanism of the machine, and insures the immediate withdrawal of this cam to its inactive position, the instant its function is completed. It will also be observed that the block 217, by which the setting cams are carried is normally maintained in an intermediate position by the opposed pressure of two coiled springs 237, and 238, this intermediate position being one of equilibrium between the springs. Therefore, in order to throw one or other of the setting cams into position to actuate the cam 200, the block 217, need only be moved from its intermediate position. This is accomplished by the motion of the lever 245, by connections which have been fully explained; but no action by this lever, or by any other part of the machine the motion of which is dependent upon the pattern chains, is required to return the setting cams to their intermediate position, since this return is accomplished in more simple fashion by the necessary contact of the fixed cam 268, with the locking plate 260, which necessarily occurs before a single rotation of the machine is completed. This quick return is permitted because of the fact that the setting cam, having once turned the plunger upon which the raising and lowering cam 200, is mounted, is not called upon to maintain the latter cam in its position, (this being done by the needles themselves), but is free to immediately resume its intermediate position, irrespective of the amount of rotation of the machine during which the raising and lowering cam 200, is called upon to operate upon the long butt needles.

A further point to be noted is that the control of the setting cams is obtained directly from mechanism the primary function of which is to control the change of the motion of the machine from rotation to reciprocation, or vice versa, so that no additional work is put upon the pattern chains, notwithstanding the performance of the additional function of controlling the raising and lowering of the cam 200. It will be readily realized that in any automatic stocking knitter where the sequence of operations is placed under the control of length, as distinguished from course measurement, the pattern chain mechanism should be simplified at every point possible and relieved of all but the absolutely essential functions by which the proper sequence of operation of the machine is controlled.

Referring to Figs. XII, XIII and XIV; the depressing picker mechanism comprises the bracket 270, adjustably secured on the cam cylinder 9, by the screws 271, extending through the slots 272, and having the semicylindrical cam 273, arranged so that when said picker is partly rotated by engaging a needle butt, it is lowered by said cam 273, and thus depresses the needle. Said picker is provided with the hub 277, which slides on the vertical shaft 278, and is normally upheld by the spring 280, encircling said shaft. The picker mechanism also includes the detent lever 284, which is pivoted on the stud 286, projecting from the standard 281, and normally tilted by the spring 287, on said stud to the position shown in Fig. XIII; wherein its rocking motion is limited by the lug 289, projecting from the standard 281. Said lever 284, may be detained in the position shown in Fig. XII, against the tension of its spring 287, by the catch lever 293, which is pivoted on the stud 294, projecting from the standard 281, and provided at its lower end with the hook 295, arranged to engage the pin 290, on the detent lever 284, as shown in Fig. XII. The oscillatory motion of said catch lever 293, is limited by the lug 296, projecting from the standard 281, against which lug it is normally held by the spring 297, encircling the stud 294. The picker mechanism is thrown into operative relation with the needles by the lever 300, shown in Fig. IV, pivoted on the stud 301, in the bed plate 1, and normally held in contact with the pin 302, by the spring 304. Said lever 300, is provided at its upper end with the pivoted trip cam 305, normally pressed by the spring 306, against the pin 307. The lower end of said lever 300, is provided with the cam 308, in operative relation to the special links 310, and 311, of the pattern chain 77, which are arranged to encounter said cam 308, and by rocking said lever 300, present its trip cam 305, in the path of the pin 292, on the catch lever 293, and thereby oscillate the latter to release the pin 290, on the detent lever 284, so that the latter is turned by its spring 287, to the position shown in Fig. XIII, whereon the picker 274, is free to engage the needles.

The picker 274, is arranged to be set in its inoperative position shown in Figs. XII and XIV, by the oscillatory cam 315, shown in Fig. I, pivoted on the stud 316, in the bed plate 1, and pivotally connected to the upper end of the lever 317, by the link 318. Said lever 317, is loosely mounted on the rock shaft 106, in operative relation to the special links 313, and 314, on the pattern chain 77, which are arranged to encounter the lower end of said lever 317, and rock the latter to move the cam 315, into the path of the pin 288, on the detent lever 284, which is thereby tilted until its pin 290, is engaged by the hook 295, of the catch lever 293. As said lever 317, rocks, it engages the lever 123, secured on the rock shaft 106, which drops the pawl 101, into operative position. The lifting pickers are automatic, and are constantly in operation during the reciprocation of the machine and arranged to raise one of the two needles lowered by the depressing picker in a well known manner. The stitch length regulating mechanism comprises the needle cylinder supporting bracket 320, secured by the pin 321, on the lower end of the reciprocatory plunger 322, arranged to slide within the split bracket 323, on the bed plate 1, shown in Figs. I and IV, provided with the clamping screw 324.

Referring to Figs. II, IV, X, and XI; the frame plate 325, is secured to the lower end of the plunger 322, beneath the bracket 320, by the screw 326, and is prevented from turning by the pin 327, projecting from the needle cylinder bracket 320, and extending into the aperture 328, in the lug 329, on said plate. As shown in Fig. II, the eccentric shaft 330, is journaled in the lugs 331, and 332, depending from the plate 325, and is provided at its outer end with the eccentric 334, having the eccentric strap 335, held in place by the cap plate 336, retained on the end of the shaft 330, by the screw 337. Said eccentric strap 335, has the upwardly extending pitman 338, with the box 339, embracing the block 340, pivoted on the stud 341, extending from the bracket 323. When the shaft 330, is rotated it is moved vertically by the eccentric 334, and thereby raises or lowers all the members carried by it, including the bracket 320, supporting the needle cylinder 9; so that the length of the stitches or loops in the fabric may be thus varied by relative movement, of the needles and sinkers. The plunger 322, is normally pressed downward by the spring 342, in the bracket 323, bearing against the bracket 320, and the adjustment may be still further varied by rotation of the set screw 343, in the top of the box 339, bearing on the block 340. The shaft 330, is provided with the hub 344, having the lever arms 345, and 346, which latter is arranged to be shifted upward by the high side link 347, in the pattern chain 77, and said lever is arranged to be shifted downward by the high side link 348, in said chain 77, encountering the lever 349, fulcrumed on the stud 350, in the bracket 113, and pivotally connected to said lever arm 346, by the screw link 354, extending from the pin 355, on said arm 346, through the rotary stud 356, on said lever 349; said link being adjustably secured in said stud 356, by the nuts 357. The rocking movement of said eccentric shaft 330, is limited by the set screws 360, and 361, arranged to engage the lever arm 345. Said stitch length device is adapted for narrowing the fabric to form the ankle of a stocking, and, being also operated when the heel and toe pockets are knit, may be employed in operative connection with a thread splicing attachment of any suitable construction, as follows:—The vertical post 370, secured in the frame plate 325, comprises the screw stem 372, provided with the milled nut 375, shown in Figs. X, and XI, having the circular series of apertures 376, for the locking plunger 378, which latter is upheld by the spring 379, in the chamber 380, in the hub 382, of the lever 383. Said hub is provided with the cam lug 385, arranged to ride up on the roller 390, journaled on the stud 391, in the stationary frame bracket 323, and lift the needle cylinder by said nut 275, and the post 370, when the lever 383, is shifted in the direction of the arrow thereon in Fig. XI. Reverse movement of said lever 383, causes its lug 382, to ride down said roller 380, and correspondingly lower the needle cylinder. The extent of the movement of the needle cylinder, thus effected, may be varied by withdrawing the locking plunger 378, and rotating the nut 275, which may be detained in any desired position by said plunger 378, engaging an aperture 376, in the circular series. The lever 383, is shifted when the change is made from rotation to oscillation or from oscillation to rotation of the cam cylinder, by its connection with the cam 74, on the sleeve 71, such connection being effected by the link 385, between said lever 383, and the depending arm 386, on one end of the rock shaft 387, which is journaled in the bearings 388, and 389, on the bed plate 4, and provided at the other end with the upwardly extending arm 392. Said arm 392, is pivotally connected to the upper end of the lever 394, which is pivoted on the frame 3, and has its lower bifurcated end embracing the cam 74, so that when the sleeve 71, is rotated, to shift the clutch cam 70, the cam 74, is also rotated to shift the stitch regulating mechanism above described. Thread spicing mechanism of any suitable form, may be conveniently supported on the standard 400, and operated by the reciprocatory sleeve 401, attached to the lever 402, on the aforesaid rock shaft 387, and the operating rod 403, in said reciprocatory sleeve 401, may be detained in normal position by the detent hook 404, pivoted on the frame 3, and having the cam 405, at its lower end arranged to engaged by the lever 406, secured on the rock shaft 106.

Referring to Figs. II and IV; the belt shifting mechanism comprises the slide rod 410, mounted in suitable bearings 411, and 412, in the bracket 113, and provided with the spring 413, between the bearing 412, and the pin 414, tending to shift said rod 410, to the left, with reference to Fig. II. The cross head 416, is secured to said rod 410, and arranged to slide horizontally on the stationary guide pin 417, extending from the frame bracket 113. Said cross head carries the rod 419, provided with the belt shifting fork 420, shown in position to guide the main driving belt to the loose pulley 13. Said belt may be shifted to the tight pulley 12, by the hand lever 422, on the rock shaft 423, journaled at its inner end in the bracket 113, and at its outer end in the bearing 424, extending from the guard 7, and the inner end of said shaft 423, carries the arm 425, connected to the pin 414, on the slide rod 410, by the S-shaped link 426. Said rod 410 is automatically operated to shift the belt to the loose pulley 13, and thereby stop the machine, by the special link 430, on the pattern chain 77, shown in Fig. XX, which is arranged to engage the pin 431, on the lever 432, pivoted on the stud 433, on the bracket 113. The inner end of said lever 432, encounters the lever 435, shown in Figs. II and V, also pivoted on the bracket 113, and provided with the finger 436, shown in Fig. III, arranged to encounter the bracket 113, and limit the movement of the lever 435. Said lever 435, is arranged to rock the lever 437, which overhangs it and is loosely mounted on the rock shaft 423, so as to tilt the arm 425, past its dead center far enough to be operated by the spring 413, to shift the driving belt to the loose pulley 13, by the fork 420, and thus stop the machine, in the position shown in the drawings.

With the chains shown in Figs. IV, and XIX, the machine operates to knit long hose, as follows: The machine is rotated to knit the leg of the hose down to the ankle, the fabric being drawn down by the take-up roller 170. When the ankle is reached, the high link 143, on the measuring chain 142, encounters the pin 182, and shifts the bell crank lever 184, which by its connecting rod 100, rocks the bell crank lever arm 111, from beneath the lever 109, permitting the latter to drop and rock the shaft 106, thereby dropping the pawl 101, into engagement with the ratchet 72. Said ratchet 72, is progressed two teeth by each reciprocation of the pawl 101, and rotates the sleeve 71, carrying the cam 70, which latter withdraws the cam 130, from under the lever 118, which drops and releases the pawl 103, which falls into engagement with its ratchet 80. Said ratchet 80, is rotated to progress the pattern chain 77, carrying the high side link 347, which shifts the lever 346, and sets the tension device to fashion the ankle. The low side link 78, engages and lifts the lever 107, to again set the lever 109, upon the bell crank lever arm 111, in which position the pawl 101, only progresses the ratchet 72, one tooth at each reciprocation, until the blank portion 79, is reached, and the cam 131, raises the levers 118, and 115, to shift the pawl 103, to the idle position, best shown in Fig. VII. Said pawl 101, reciprocates idly on said portion 79, until the special link 144, encounters the pin 182, and operates (like the link 143), to again drop the pawl 101, into engagement with the ratchet 72, to rotate the cam 70, and withdraw the cam 131; thereby dropping the pawl 103, into engagement with the ratchet 80, to progress the pattern chain 77, which carries the side link 87, under the lever 107, and raises it to again set the lever 109, on the arm 111, and the pawl 101, then progresses the ratchet 72, one tooth at a time until it encounters the blank portion 81, and there reciprocates idly, while the pawl 103, continues to progress the pattern chain 77. The last described rotation of said cam 70, at once shifts the clutch collar 56, from engagement with the rotary pinion 18, to engage the oscillatory pinion 49, and oscillate the cam cylinder 9, by the connecting lever 66, whose movement lifts the lever 245, carrying the cams 212, and 213, the lug 249, riding on the upper surface of the cam 255. Said cams 212, and 213, are detained in their raised positions by the locking plate 260, until after the cam 213, engages the projection 210, on the plunger 201, which shifts the cam 200, into the path of the long hubs of the half back needles and raises them out of the path of the knitting cams. The cam 268, follows and shifts the rocking plate 260, and releases the cams 212, and 213, which are thereupon returned under the influence of the springs 237, and 238, to their intermediate inoperative position. Said machine is then oscillated to knit the heel; a needle being raised at each end of the active series at each oscillation, until the minimum number of needles remain operative; then the special link 310, on the pattern chain 77, encounters and rocks the lever 300, which presents its cam 305, in the path of the pin 292, on the catch lever 293, and rocks the latter to disengage the detent lever 284, which rocks by the tension of its spring 287, and releases the picker 274, into operative position to lower two needles at each end of the active series at each oscillation.

The machine continues to oscillate until all of the needles for knitting the heel pocket have been thus lowered into operation. The high link 313, on the pattern chain 77, then encounters and rocks the lever 317, and through its connecting link 318, oscillates the cam 315, into the path of the pin 288, on the detent lever 284, and rocks the latter, sufficiently to engage its pin 290, with the hook 295, of the catch lever 293, and thereby locks the picker 274, out of action as best shown in Figs. XII, and XIV. When said lever 317, is rocked it encounters, and rocks the lever 123, thereby rocking the shaft 106, against the tension of the spring 110, on the lever 109, and, although the latter is still upheld by the arm 111, best shown in Fig. V, the pawl 101, drops into engagement with the ratchet 72, to rotate it the distance of two teeth to pass the blank portion 81, to the position shown in Fig. VII, and thereby turns the clutch cam 70, carrying the cam 130, to raise the pawl 103, out of engagement with its ratchet 80, and stop the progression of the pattern chain 77. Said movement of the cam 70, shifts the clutch collar 56, by the connecting lever 66, from engagement with the oscillatory pinion 49, to engage the rotary pinion 18, and rotate the cam cylinder 9. Said lever 66, lowers the lever 245, carrying the cams 212, and 213, by the lug 249, riding on the lower surface of the cam 255. Said cams 212, and 213, are detained in their raised position by the locking plate 260, until after the cam 212, engages the projection 209, on the plunger 201, and shifts the cam 200, in the path of the hubs of the raised half back needles and lowers them into operative position. The cam 268, follows, shifts said rocking plate 260, and releases the cams 212, and 213, which return to their intermediate inoperative position. The machine is then operated to knit the foot and toe; the special links 148, and 149, on the measuring chain 142, operating in conjunction with the side links 91, and 93, and the special links 311, and 314, on the pattern chain 77, as did the special links 143, and 144, with the side links 78, and 87, and the special links 310, and 313, for knitting the leg and heel. Just before the toe pocket is finished the high side link 348, encounters and raises the lever 349, which resets the tension device to knit the leg portion of the next hose down to the ankle.

With the chains shown in Fig. XX, a ribbed top is placed on the needles and connected to the take up rollers 170, and 180, by the flexible connector 171, and said machine operates to knit half hose, as follows: The measuring chain 440, and the pattern chain 441, and the parts directly connected with the latter being initially in the position shown in Fig. XX; the machine is rotated to knit the leg, both pawls 101, and 103, being in operative engagement with their respective ratchets 72, and 80. The side link 446, lifts the lever 107, and sets the rock shaft 106, so that the pawl 101, can turn the ratchet 72, only one tooth at each reciprocation until the blank portion 79, is reached and said pawl reciprocates idly thereon, and the measuring chain is progressed until the special link 442, shifts the bell crank lever 184, and releases the pawl 101, and thereby rotates the cam 70, to change from rotary to reciprocatory motion of the cam cylinder 9, and withdraw the cam 131, from under the lever 118, and thus drop the pawl 103, into engagement with the ratchet 80. The half back needles are then raised and the pickers operated as above described. The pattern chain 441, being progressed, the low side link 447, sets the pawl 101, to turn the ratchet 72, one tooth at each reciprocation until the blank portion 81, is reached and said pawl 101, reciprocates idly thereon while the ratchet 80, continues to progress the pattern chain 441. The special link 450, then rocks the lever 300, and releases the picker 274, into operative position to lower the needles as above described, and, after a sufficient number of oscillations the special link 452, rocks the lever 317, to lock the picker 274, out of action, and, at the same time, rocks the shaft 106, to engage the ratchet 72, by its pawl 101, and turn the latter a distance of two teeth to pass the plank portion 81, and thus bring the cam 130, beneath the lever 118, to raise the pawl 103, from engagement with its ratchet 80, and stop the progression of the pattern chain 441. The cylinder 9, then rotates to knit the foot, and the pawl 101, reciprocates idly on the blank portion 73, until the special link 443, rocks the bell crank levers, as above described, to again drop the pawl 101, into engagement with the ratchet 72, which is then turned until the blank portion 79, is reached and said pawl 101, is set by the low link 448, to rotate idly thereon.

When the foot is finished the special link 444, rocks the bell crank lever 184, and the pawl 101, is again dropped into engagement with the ratchet 72, and the motion of the cylinder 9, changed to oscillation, to knit the toe pocket; the special links 451, and 453, and the low side link 449, operating as did the special link 450, and 452, and the low side link 447. When the toe pocket is finished, the cylinder 9, is rotated to knit the courses technically known as "loopers rounds"; the special link 445, again drops the pawl 101 into operative position, and the pattern chain 441, is progressed until the link 430, encounters the pin 431, on the bell crank lever 432, and raises the latter sufficiently to shift the belt from the tight pulley 12, to the loose pulley 13, and thereby stop the machine. The machine is then turned by hand one revolution to cast off the half hose, and one revolution to raise the needles. The needle cylinder after being then removed and a rib top placed on the needles, is again inserted ready to knit the next half hose, in which case the flexible connector above referred to is attached to the ribbed top and arranged to be engaged by the roller 170, the measuring chain 440, is then set to the position shown in Fig. XX, and controls the progress of the knitting including the insertion of the heel and toe pockets.

We do not desire to limit ourselves to the precise details of construction and arrangement herein set forth, as it is obvious that various modifications may be made therein without departing from the essential features of our invention.

We claim:—

1. In an automatic circular hosiery knitting machine, the combination with measuring mechanism comprising a measuring chain arranged to measure the length of string work fabric irrespective of the number of courses therein; mechanism controlled by said measuring chain, determining the location of an indeterminate series of pockets in said fabric, in accordance with the measurement of said fabric, substantially as set forth.

2. In an automatic circular hosiery knitting machine, the combination of measuring mechanism comprising a roller which rotates according to the length of string work fabric produced by the machine, irrespective of the number of courses therein; motion changing mechanism and fashioning mechanism operatively related to effect the knitting of an indeterminate series of pockets in said fabric; and operative connections between said roller and said motion changing mechanism, substantially as set forth.

3. In an automatic circular hosiery knitting machine, the combination with motion changing mechanism; of measuring mechanism, comprising a take-up roller and a pattern chain arranged to be progressed by said roller, to control the motion changing mechanism; a half-back needle cam; and, a cam arranged to be shifted by said motion changing mechanism to operate said half-back needle cam, substantially as set forth.

4. In an automatic circular hosiery knitting machine, the combination with measuring mechanism, comprising a take-up roller and a pattern chain arranged to be progressed by said roller; of a motion changing mechanism, comprising a clutch and a cam to shift said clutch; connections arranged to control said clutch cam by said pattern chain; a cam adapted to raise and lower the half-back needles; and, a pair of setting cams arranged to be shifted by the motion changing mechanism to operate said half-back needle cam, substantially as set forth.

5. In an automatic circular hosiery knitting machine, the combination with motion changing mechanism comprising a clutch having two positions, in respective correspondence with which the cam cylinder rotates and oscillates; of a lever connected to said clutch; a cam arranged to shift said lever; a ratchet secured to said clutch cam; a reciprocatory pawl arranged to engage said ratchet; means arranged to normally detain said pawl in idle position during the rotation of said cylinder; measuring mechanism, arranged to release said pawl from its idle position to shift said ratchet when a predetermined length of fabric has been knit, and thereby operate said motion changing mechanism; a half-back needle cam; and, a pair of setting cams arranged to be shifted by said lever to operate said half-back needle cam, substantially as set forth.

6. In a circular hosiery knitting machine, a raising and lowering cam for the half-back needles, rotatably mounted upon an axis radial to that of the knitting cylinders and capable of additional motion coincidently with its axis; means for rotating said cam plate in either direction from an intermediate inactive position to an operative position suitable respectively for either raising or lowering the half-back needles; the radial distance of said cam from the axis of the cylinders when in its intermediate position being such as to put it out of reach of the butts of the needles; and mechanism whereby rotary movement of said cam plate from its intermediate position to either of said operative positions occasions a movement of said cam plate coincidently with its axis which thrusts said cam plate within reach of the butts of the needle.

7. In a circular hosiery knitting machine, a raising and lowering cam for the half-back needles rotatably mounted upon an axis radial to the knitting cylinders; means tending to maintain this cam normally in an intermediate inoperative position; and means for momentarily thrusting said cam into either of its operative positions, whereupon continuing engagement with needle butts alone holds it in operative position.

8. In a circular hosiery knitting machine, a raising and lowering cam for the half-back needles rotatably mounted upon a horizontal plunger arranged to rotate upon and also to move coincidently with its axis; oppositely inclined cams engaging said raising and lowering cam; a spring tending to thrust said cam into the depression between said oppositely inclined cams and maintain it there in inoperative position; and means for rotating said cam to an angle proper to raise or lower needles, said motion of rotation coacting with one or other of said oppositely inclined cams to move the plunger coincidently with its axis, whereby the raising and lowering cam is thrust into position to operatively engage the butts of the needles.

9. In an automatic circular hosiery knitting machine a raising and lowering cam for the half-back needles; a spring normally maintaining said cam in inoperative position; a pattern chain with connections whereby said cam is at intervals thrown into operative position against the thrust of said spring; and means independent of said pattern chain whereby said cam is returned by said spring to its inoperative position as soon as it has performed its function of raising or lowering the series of half-back needles.

10. In an automatic circular knitting machine a raising and lowering cam; paired setting cams by which the position of the raising and lowering cam is controlled; opposed springs which by their equilibrium hold said setting cams normally in an intermediate position inoperative to effect the raising and lowering cam; a pattern mechanism and connections by which the setting cams are at the proper moment, temporarily thrown against the thrust of one or other of said springs into a position to control the movement of the raising and lowering cam; and releasing mechanism independent of said pattern mechanism, whereby said spring is permitted to return said raising and lowering cam to its inoperative position.

11. In an automatic circular knitting machine, a raising and lowering cam; paired setting cams by which the position of the raising and lowering cam is controlled; a slide block upon which the setting cams are carried; opposed springs by the tension of which the slide block is normally maintained in an intermediate position; means for throwing said slide block against the tension of one or other of said springs into position to operate the raising and lowering cam; and a locking plate, whereby said slide block when moved to operative position is temporarily held in such position.

12. In an automatic circular hosiery knitting machine, the combination with a rotary cam cylinder carrying mechanism for raising and lowering the half-back needles; of a pair of setting cams arranged to operate said mechanism; a locking plate arranged to detain said cams in operative positions; a cam, carried by said cylinder, arranged to trip said locking plate and permit said setting cams to return to their inoperative position, substantially as set forth.

13. In an automatic circular hosiery knitting machine, a raising and lowering cam capable of assuming an intermediate position out of reach of the needles; and also capable of being thrust into operative position to either raise or lower the needles; a spring normally holding said cam in its inoperative position; paired setting cams capable of assuming an intermediate inoperative position, and also capable of moving into position to actuate said raising or lowering cam and to throw it into operative position against the tension of its spring; and means whereby said paired setting cams may be thrown into position to operate the raising or lowering cam against the tension of its spring.

14. In an automatic circular hosiery knitting machine, the combination with relatively movable cam and needle cylinders; of fashioning mechanism, comprising needle lifting and depressing pickers; motion changing mechanism; a measuring mechanism arranged to measure the length of the fabric irrespective of the number of courses therein and connected to control the different operations of the machine, comprising a roller provided with a shaft; a measuring chain carried by said shaft, arranged to initiate the movement of the motion changing mechanism and the movement of a pattern chain; means supporting said pattern chain for rotation independently of said measuring chain; and, connections actuated by said pattern chain, arranged to reverse the movement of said motion changing mechanism and terminate the movement of said chain, substantially as set forth.

15. In an automatic circular hosiery knitting machine, the combination with relatively movable cam and needle cylinders; of fashioning mechanism comprising needle lifting and depressing pickers and a cam arranged to raise and lower the half-back needles; mechanism arranged to take up the fabric and measure its length, irrespective of the number of courses therein, and connected to control the different operations of the machine, comprising a roller provided with a shaft; a measuring chain carried by said shaft, arranged to initiate the movement of the motion changing mechanism and said half-back cam, and the movement of a pattern chain; a countershaft supporting said pattern chain for rotation independently of said measuring chain, and, connections actuated by said pattern chain, arranged to operate said pickers, reverse the movement of said motion changing mechanism, and terminate the movement of said chain, substantially as set forth.

16. In an automatic circular hosiery knitting machine, the combination with relatively movable cam and needle cylinders; of a driving shaft connected to one of said cylinders; a rotary sleeve on said shaft; a pinion secured to said sleeve; a second pinion loosely mounted on said shaft; a clutch collar, between said pinions, keyed to rotate with said shaft, but capable of longitudinal movement thereon to alternately engage said pinions; a lever arranged to shift said clutch collar; a cam arranged to shift said lever; means arranged to rotate said cam; guides; a reciprocatory yoke supported by said guides and provided with a slot; a gear arranged to mesh with the pinion secured to said sleeve; a crank pin extending from said gear into said slot, arranged to reciprocate said yoke; a sector arranged to mesh with said second pinion; and, a crank pin extending from said sector into said slot, arranged to oscillate said sector and second pinion, in connection with said shaft and cylinder, substantially as set forth.

17. In an automatic circular hosiery knitting machine, the combination with a cam cylinder, a needle cylinder, fashioning mechanism and motion changing mechanism; of a measuring mechanism comprising a measuring chain arranged to measure the length of the fabric, irrespective of the number of courses therein, and connected to control by means of said chain the initiation of the movement of the motion changing mechanism, in accordance with the length measured, substantially as set forth.

18. In an automatic circular hosiery knitting machine, the combination with a cam cylinder, a needle cylinder, fashioning mechanism and motion changing mechanism; of measuring mechanism comprising a measuring chain arranged to measure the length of the fabric, irrespective of the number of courses therein, and connected to control by means of said chain the different operations of the machine, in accordance with the length measured, substantially as set forth.

19. In an automatic circular hosiery knitting machine, the combination with a rotary cam cylinder; of a needle picker having an arm; a detent lever arranged to detain said picker in inoperative position; a catch lever having a hook arranged to engage said detent lever; a trip cam, movable to release said catch lever, and thereby release said detent lever and picker; an oscillatory cam, arranged to engage said detent lever with said catch lever; and, a pattern device arranged to operate both said trip cam and oscillatory cam, substantially as set forth.

20. An automatic circular hosiery knitting machine having a motion changing mechanism for changing alternately to rotary and reciprocating knitting comprising a pattern chain, driving means therefor, and means controlled by the produced fabric for throwing said driving means into operation.

21. In an automatic circular hosiery knitting machine having motion changing mechanism for changing alternately to rotary and reciprocating knitting, a pattern mechanism operative for reciprocating knitting only, and a measuring mechanism operated by the rotary-knitted fabric and arranged to automatically throw said pattern mechanism into operation.

22. An automatic circular hosiery knitting machine having a motion changing mechanism for changing alternately to rotary and reciprocating knitting comprising a pattern chain and means controlled by the produced fabric and said chain for intermittently driving the latter.

23. An automatic circular hosiery knitting machine having a motion changing mechanism for changing alternately to rotary and reciprocating knitting, comprising a pattern ratchet wheel and a continuously operated driving pawl therefor, a measuring mechanism operated by the rotary-knitted fabric, and controlling means for said driving pawl arranged to be operated by said measuring mechanism to automatically throw the pawl into mesh with said ratchet wheel upon completing predetermined lengths of rotary-knitted fabric.

24. In an automatic circular hosiery knitting machine, the combination with the motion changing mechanism for causing the change of the cam cylinder operating mechanism from rotation to reciprocation, and the take-up roller, of mechanism, thrown into action by the rotation of the take-up roller, for causing said motion changing mechanism to act, and means, independent of the movement of the take-up roller, to render said tripping mechanism inoperative when the change has been made.

25. In an automatic circular hosiery knitting machine, the combination with the motion changing mechanism for causing the change of the cam cylinder operating mechanism from rotation to reciprocation, and the take-up roller, of mechanism, thrown into action, at predetermined times, by the rotation of the take-up roller, for causing said tripping mechanism to act, and means, independent of the movement of the take-up roller, to render said motion changing mechanism inoperative when the change has been made.

26. In an automatic circular hosiery knitting machine, the combination with the motion changing mechanism for causing the change of the cam cylinder operating mechanism from rotation to reciprocation, and the take-up roller, of a chain driven by said take-up roller, a lug or lugs upon said chain and mechanism adapted, when struck by said lug, to cause said motion changing mechanism to act, and means, independent of the movement of the take-up roller, to render said motion changing means inoperative when the change has been made.

27. In an automatic circular hosiery knitting machine, the combination with the motion changing mechanism for causing the change of the cam cylinder operating mechanism from rotation to reciprocation, and the take-up roller, of a chain driven by said take-up roller, a lug or lugs upon said chain and mechanism adapted, when struck by said lug, to cause said motion changing mechanism to act, and means, independent of the movement of the take-up roller, to render said motion changing means inoperative at a predetermined point when the change has been made.

28. In an automatic circular hosiery knitting machine, in combination, motion changing means for throwing into action the mechanism to change the cam cylinder from rotation to reciprocation, a take-up roller, means adapted, in the rotation of the take-up roller, to move said motion changing means, and means, independent of the movement of the take-up roller, to stop said motion changing means when the change has been made.

29. In an automatic circular hosiery knitting machine, in combination, motion changing means for throwing into action the mechanism to change the cam cylinder from rotation to reciprocation, a take-up roller, means adapted, in the rotation of the take-up roller, to move said motion changing means, and means, independent of the movement of the take-up roller to stop said motion changing means, at a predetermined point, when the change has been made.

30. In an automatic circular knitting machine having change mechanism for changing alternately to rotary and reciprocating knitting, comprising a pattern chain; driving means therefor; means controlled by the produced fabric for throwing said driving means into operation; a raising and lowering cam for the half-back needles; means for throwing said raising and lowering cam into operative position, dependent upon the above mentioned change mechanism; and means for throwing said raising and lowering cam into inoperative position, as soon as it has performed its function, independent of said change mechanism.

In testimony whereof, we have hereunto signed our names at Philadelphia, Pennsylvania, this 26th day of August 1904.

JOHN B. PAXTON.
ELLIS I. O'NEILL.

Witnesses:
JAMES H. BELL,
ANNA F. GETZFREAD.